Nov. 6, 1923.  
G. F. MOORS ET AL  
REGULATING DEVICE FOR STEAM BOILERS  
Filed July 22, 1918   7 Sheets-Sheet 2  
1,473,120
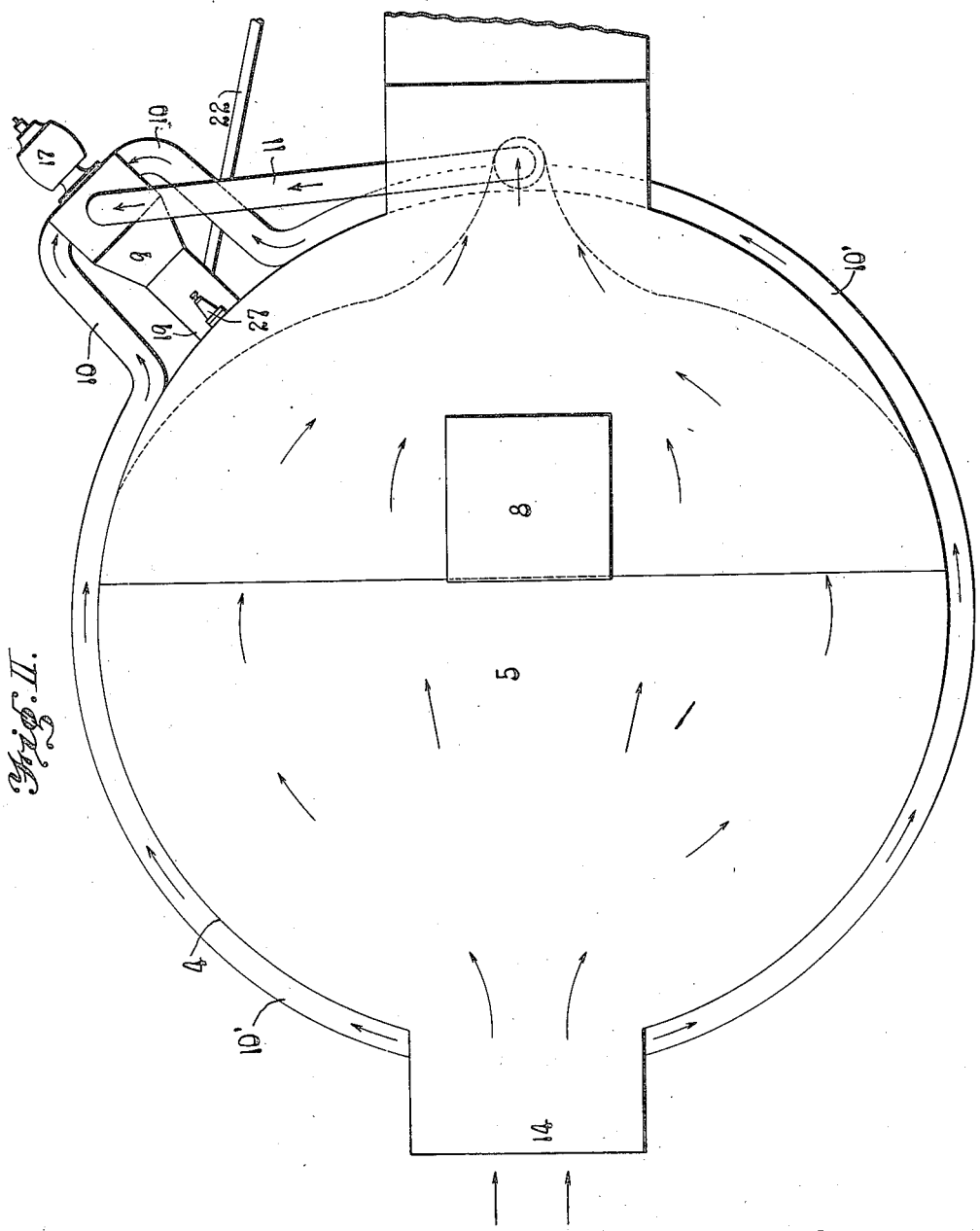

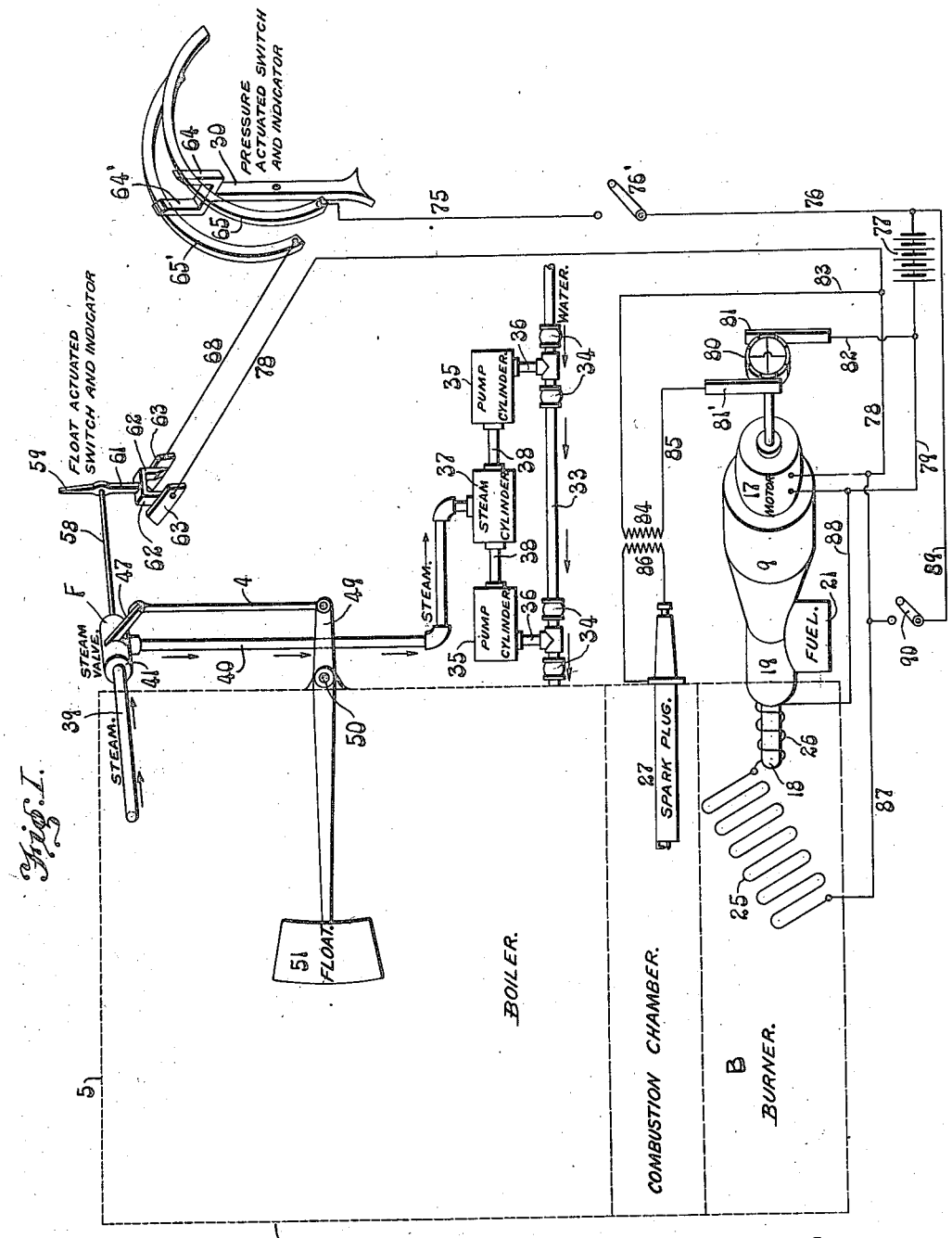

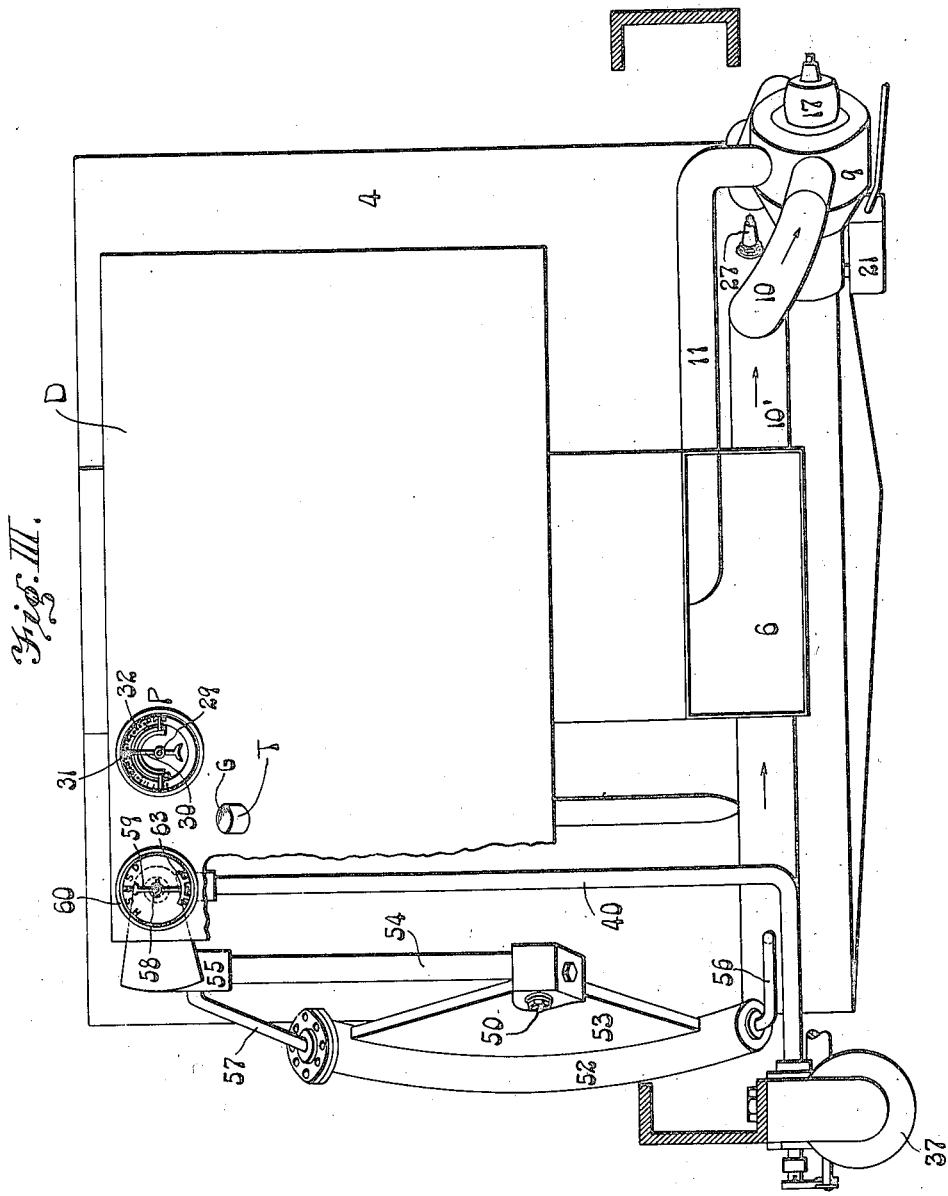

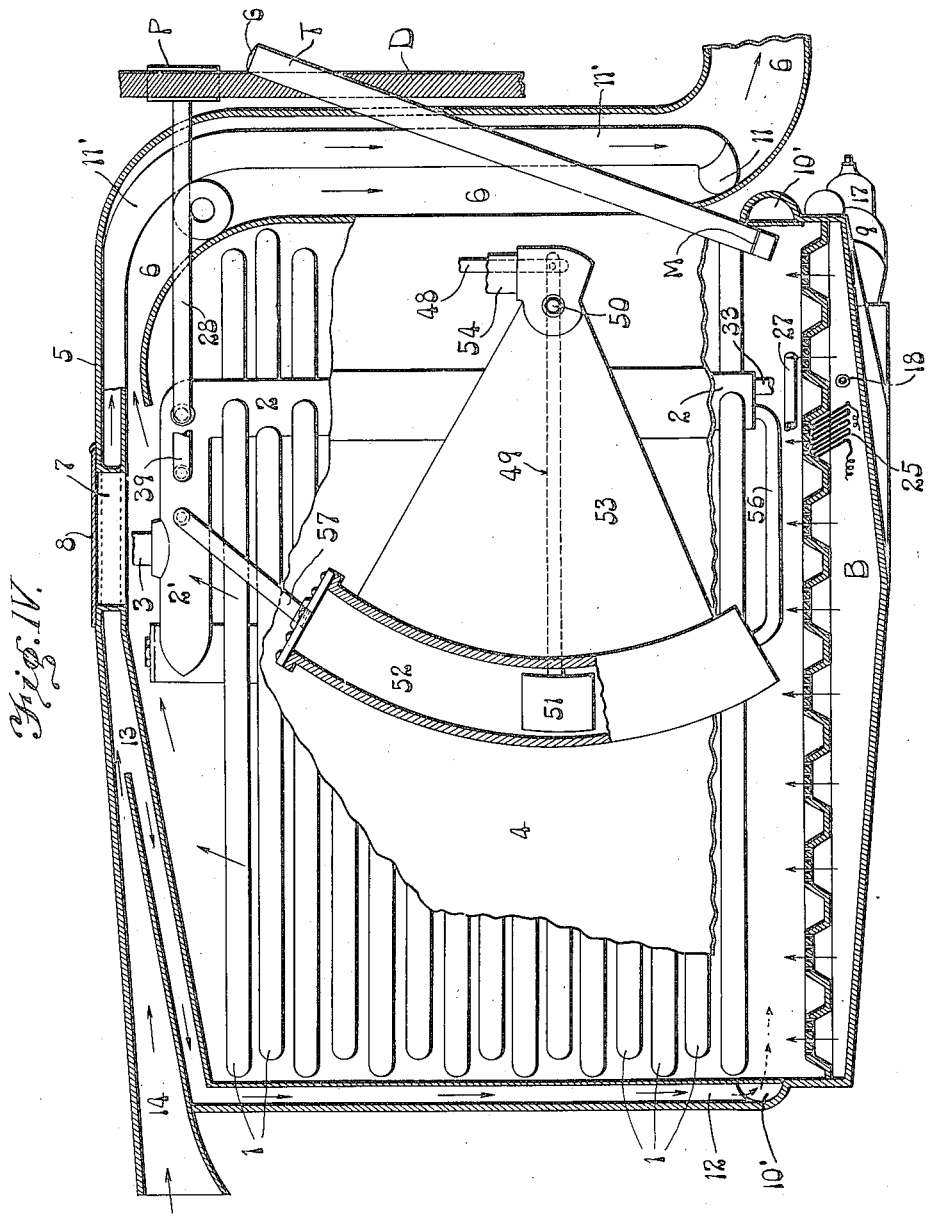

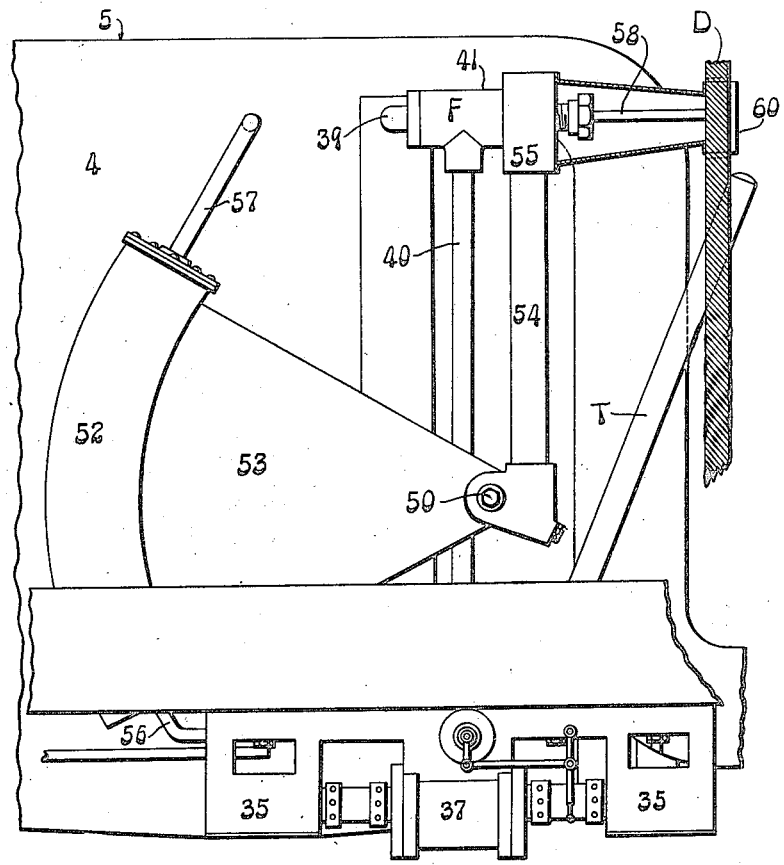

Nov. 6, 1923.                                                                 1,473,120
G. F. MOORS ET AL
REGULATING DEVICE FOR STEAM BOILERS
Filed July 22, 1918                         7 Sheets-Sheet 6
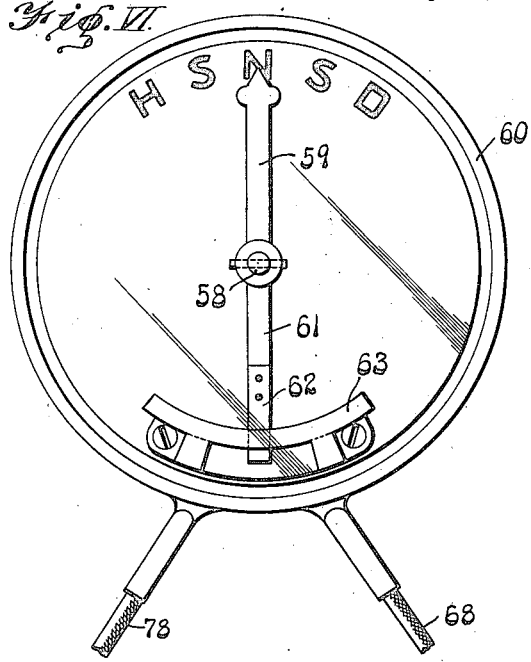
Fig. VI.
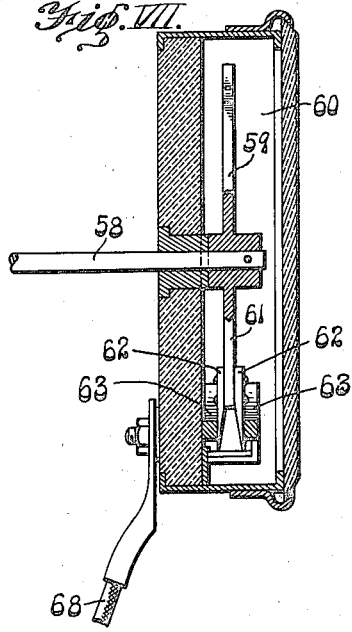
Fig. VII.
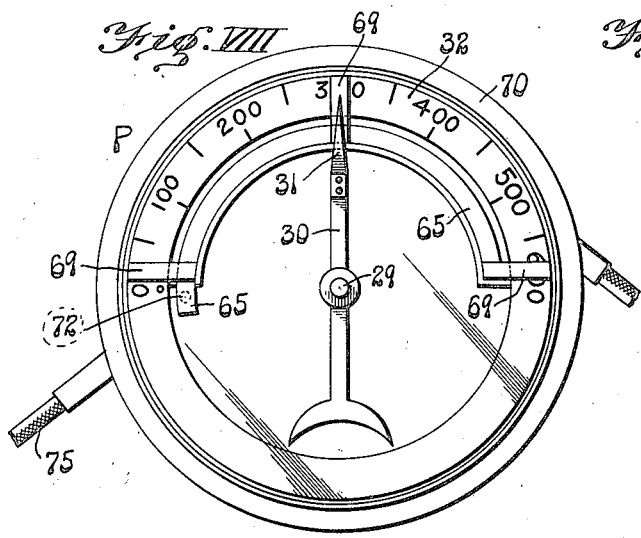
Fig. VIII.
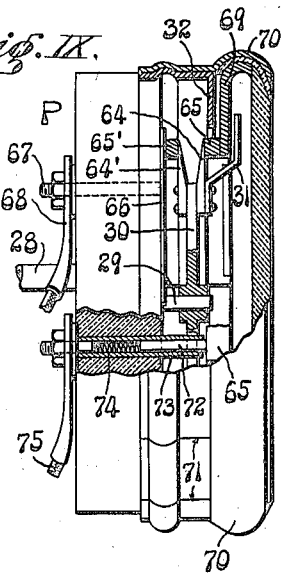
Fig. IX.
Inventors
G. F. MOORS
E. E. MARTIN
by Wright Cook
His Attorneys.
Attest.
Charles A. Becker

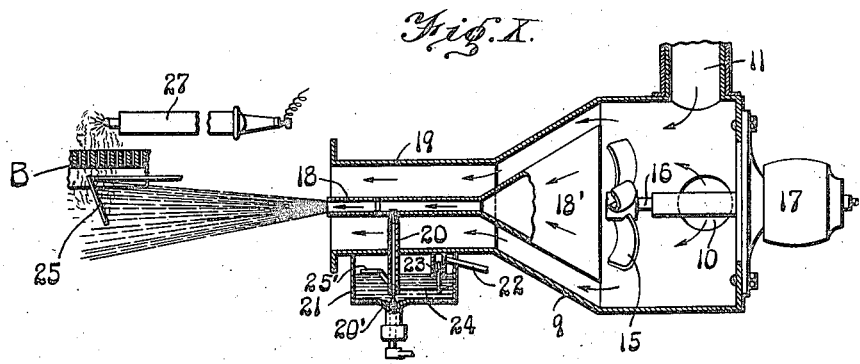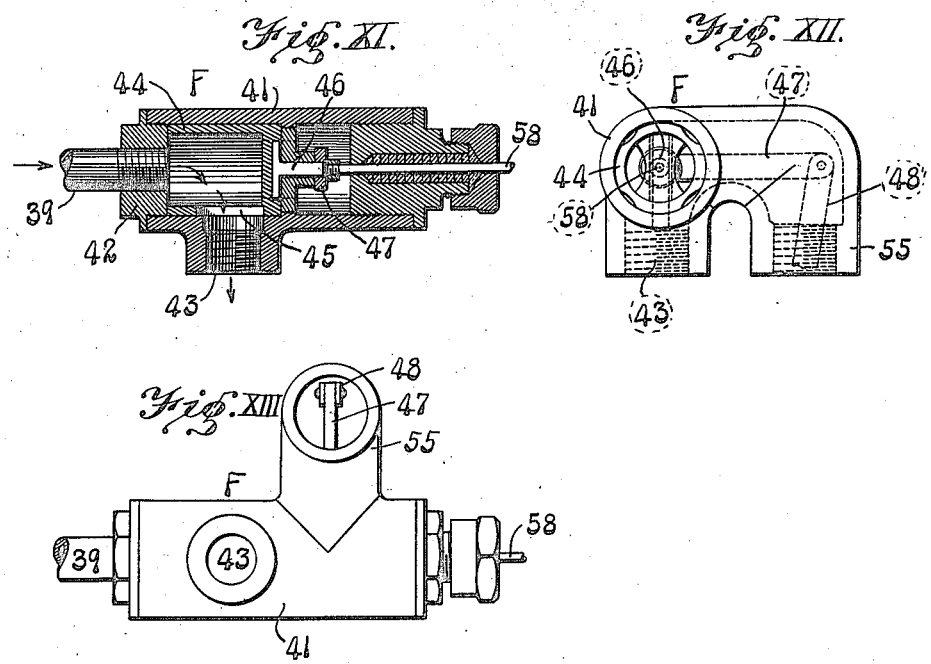

Patented Nov. 6, 1923.

1,473,120

UNITED STATES PATENT OFFICE.

GEORGE F. MOORS AND EDWARD E. MARTIN, OF ST. LOUIS, MISSOURI, ASSIGNORS TO THE RECIP-ROTO ENGINE COMPANY, OF ST. LOUIS, MISSOURI, A CORPORATION OF DELAWARE.

REGULATING DEVICE FOR STEAM BOILERS.

Application filed July 22, 1918. Serial No. 246,183.

*To all whom it may concern:*

Be it known that we, GEORGE F. MOORS and EDWARD E. MARTIN, citizens of the United States of America, and residents of the city of St. Louis, State of Missouri, have invented new and useful Improvements in Regulating Devices for Steam Boilers, of which the following is a full, clear, and exact description, reference being had to the accompanying drawings, forming a part of this specification.

Our invention relates to improvements in automatic regulating devices for steam boilers, one of the objects being to produce a simple and efficient means for regulating the fire whereby the boiler is heated, and another object is to provide an improved means for controlling the admission of water to the boiler.

More specifically stated, an object is to provide a simple automatic safety device whereby the fire is lowered or extinguished when the boiler pressure rises to a predetermined maximum degree, and also when the water level is too high or too low.

An important object of the invention is to accomplish all of the above mentioned results through the medium of a simple combination of elements adapted to cooperate with the steam generating plant of a steam driven motor vehicle, and also adapted to withstand the service conditions to which a power plant of this kind is subjected.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

In the preferred form of the invention, the boiler is provided with a burner and a carburetor for supplying fuel thereto. A fan driven by an electric motor is used to force the fuel from the carburetor to the burner, and the electric motor is controlled automatically so as to regulate the discharge of fuel to the burner. When the water level is too high or too low, or when the boiler pressure rises to a predetermined maximum degree, the electric motor is stopped automatically so as to discontinue the delivery of fuel. Fuel cannot be supplied to the burner when the water level is too high or too low, nor when the boiler pressure is too high. After the electric motor has been automatically stopped, it will be started automatically to resume the delivery of fuel as soon as the abnormal condition in the boiler is overcome; and at this time the fuel is ignited through the medium of an ignition device which cooperates with the electric motor.

In addition to the foregoing, the preferred form of the invention includes automatic means for controlling the delivery of water to the boiler, and means for heating the fuel before it reaches the ignition device. All of these various elements cooperate with each other to automatically control the fire and water, as will be hereinafter described.

Fig. I is a diagrammatical view of a boiler regulating system, embodying the features of this invention.

Fig. II is a plan view showing the boiler housing and the ducts for delivering hot air to the carburetor.

Fig. III is a rear elevation of the boiler, and it also shows two combined switches and indicators on the dash of a motor vehicle.

Fig. IV is a side elevation, partly in section, of the parts shown in Figs. I and II.

Fig. V is a side elevation of the elements near the rear portion of the boiler, the dash of the motor vehicle being shown in section.

Fig. VI is an enlarged detail view showing the combined switch and indicator which moves in response to changes in the level of the water in the boiler.

Fig. VII is a vertical section of the device shown in Fig. VI.

Fig. VIII is an enlarged detail view of a pressure gauge provided with an adjustable automatic switch for starting and stopping the electric motor.

Fig. IX is a side elevation, partly in section of the device shown in Fig. VIII.

Fig. X is a detail view illustrating the means for delivering fuel to the burner, and also showing the ignition device.

Fig. XI is a longitudinal section of the automatic valve for controlling the delivery of water to the boiler.

Fig. XII is a front elevation of the valve and valve housing.

Fig. XIII is an inverted plan view of the device shown by Figs. XI and XII.

The boiler herein shown comprises a series of water and steam receiving tubes 1 (Fig IV) having their ends connected to a manifold 2 provided with a horizontal portion 2' corresponding to the steam dome of an ordinary boiler. 3 designates the main steam pipe leading from the horizontal portion 2' of the manifold.

The burner B (Figs. I, IV and X), located directly below the tubes 1, is a large hollow member provided at the top with outlet ports for the discharge of gaseous fuel. This burner forms the bottom wall of a cylindrical housing which encloses the boiler, said housing having a cylindrical side wall 4 and a top wall 5. The products of combustion rising from the burner, pass between the tubes 1, and escape from the boiler housing by passing through an outlet passageway 6 (Fig. IV) leading from the upper portion of the boiler housing to the rear lower portion thereof. The top wall of the boiler housing is provided with an outlet 7 for the products of combustion, but this outlet is normally closed by a lid or damper 8.

To facilitate the ignition and combustion of the hydrocarbon fluid, we prefer to deliver hot air to the carburetor where the air is mixed with a relatively cool hydrocarbon fluid. The carburetor is provided with a housing 9 to which the hot air is delivered by means of pipes 10 and 11. The pipes 10 form continuations of a circular hot air duct 10' formed around the lower portion of the boiler housing, as shown most clearly in Figs. II, III and IV. A vertical duct 12 (Fig. IV) formed at the front of the boiler housing, communicates with the circular duct 10' and also with an upper duct 13 formed at the top of the boiler housing. 14 designates an inlet duct whereby the air to be heated is conducted to the upper duct 13. Some of the air entering through the inlet 14 passes through the top duct 13 and thence through the vertical duct 12 to the circular duct 10' leading to the pipes 10 whereby the air, after being heated, is delivered to the carburetor housing 9. The hot air pipe 11, connected to the carburetor housing, forms a continuation of a vertical pipe 11' arranged within the flue 6 (Fig. IV) and the upper end of this vertical pipe is in free communication with the duct 13 at the top of the boiler housing. It will now be understood that the air passing through these various ducts, is exposed almost directly to the hot products of combustion, and that it is delivered to the carburetor at a very high temperature.

A rotary fan 15 (Fig. X) arranged within the housing 9 is secured to the shaft 16 of an electric motor 17. A relatively small discharge nozzle 18 is surrounded by a large nozzle 19, and one end of the nozzle 18 is flared to provide a funnel-shaped intake member 18' immediately in front of the fan 15. When the fan 15 is in operation, a current of air is forced through the funnel-shaped member 18' and through the discharge nozzle 18 so as to form a partial vacuum in a vertical tube 20 which extends from the discharge nozzle to a reservoir 21 containing a hydrocarbon liquid. The liquid is thus drawn from the reservoir 21 and mixed with the air current in the nozzle 18, whereby it is atomized and injected into the hollow burner. The reservoir 21 may be provided with an intake pipe 22 and a valve 23 for controlling the discharge of liquid from said pipe 22. The valve 23 is preferably operated through the medium of a lever 24 provided with a float 25', as shown in Fig. X. When the burner is in service, a draft is created by the hot products of combustion rising in the boiler housing, and this draft tends to draw hot air through the carburetor housing 9 as indicated by arrows in Fig. X. A large volume of this air can flow freely through the large nozzle 19, and a hot blast is produced in the nozzle 18 which lies directly in front of the rotary fan 15. A valve 20' is preferably located in the vertical tube 20.

In starting the fire, the blast of cool air is discharged through the nozzle 18 so as to draw a fine stream of hydrocarbon liquid through the vertical tube 20 (Fig. X), and the mixture of air and atomized liquid is injected into the hollow burner. To facilitate the ignition of this relatively cool charge passing from the carburetor, an electrically heated grid 25 is located directly in front of the nozzle 18 (Figs. I, IV and X) and the nozzle itself may be surrounded by an electric heater in the form of a coil of resistance wire 26, shown diagrammatically in Fig. I. The grid 25 is preferably a single bar made of resistance material and adapted to be heated by a current of electricity. The resistance coil 26 and the grid 25 are preferably connected together as shown in Fig. I, and an electric current is transmitted through these elements as will be hereinafter described.

27 designates a spark plug (Figs. I, IV and X) located in the combustion chamber above the grid 25. In lighting the burner, a combustible gas is produced by the mixture of air and finely divided hydrocarbon liquid, which is discharged onto the hot grid 25, the gas being free to rise from the grid 25 and free to pass through the perforations in the burner, to the spark plug 27, as suggested by Fig. X. An inspection tube T, shown in Figs. III, IV and V, extends from the dash D to the combustion chamber immediately above the burner. The upper end of this tube is preferably closed by colored glass G which is illuminated by the fire at the burner. The lower portion of the inspection tube is preferably closed by a window M (Fig. IV) made of mica or the like. The regulation of the fire is automatic, but it is desirable for the operator to positively ascertain whether the fire is responding to the automatic devices, and this can be conveniently done by using the inspection tube T.

A pressure gage P, mounted on the dash D of the motor vehicle, as shown in Figs. III and IV, is connected to the boiler by means of a steam pipe 28, said gage having a central shaft 29 to which an arm 30 is secured. A pointer 31, carried by the arm 30, cooperates with graduations on a stationary dial 32 to indicate the pressure in the boiler. Pressure gages having pointers and dials of this kind are so old and well understood in the art that we do not deem it necessary to show any particular means for transmitting movement to the shaft 29 (Figs. III, VII, and IX) carrying the arm 30 and pointer 31. It is to be understood that the steam pressure is transmitted from the boiler through the steam pipe 28, to the pressure gage P, and that the central shaft 29 moves in response to changes in the boiler pressure, the pressure being indicated by the pointer 31 and dial 32 in the usual manner. This gage is used to actuate an electric switch which will be hereinafter described.

A water supply pipe 33 (Figs. I and IV) leading to the lower portion of the boiler, is provided with suitable check valves 34 which open in the direction indicated by arrows in Fig. I to allow the water to flow to the boiler. The water pump, shown diagrammatically in Fig. I, comprises pump cylinders 35 connected by means of pipes 36 to the water supply pipe 33, and a steam cylinder 37 interposed between the pump cylinders to provide for the transmission of power to the pumping devices. In Fig. I we have shown piston rods 38 extending from the steam cylinder to the pump cylinders, and it will, of course, be understood that the complete pumping device will include various other details of construction, but no invention is herein claimed for a pump of this kind, and illustration of the various details is, therefore, deemed unnecessary. The means for conducting steam from the boiler to the steam cylinder comprises a valve F (Figs. I, IV and V), a pipe 39 leading from the boiler to said valve, and a pipe 40 leading from the valve to the steam cylinder 37. The valve F is operated automatically to control the delivery of water to the boiler, as will be hereinafter described.

The valve F comprises a cylindrical valve housing 41 (Figs. XI, XII and XIII) provided with an inlet head 42 and having an outlet opening 43 for the reception of the pipe 40. An oscillatory cylindrical valve 44 is open at one end to receive the steam admitted through the pipe 39, and provided with an outlet port 45 adapted to register with the outlet opening 43. This valve may be oscillated to control the flow of steam through the valve housing 41, thereby controlling the flow of steam from the boiler to the pump. A valve stem 46 (Figs. XI and XII) secured to the valve 44, is provided with an operating arm 47, the latter being connected (Figs. I, IV and XII) by means of a link 48 to a lever 49 pivoted at 50 and provided with a float 51. The valve operating devices just referred to are enclosed by an arcuate float chamber 52 within which the float is mounted, a segmental chamber 53 communicating with the float chamber and adapted to receive the lever 49, and a vertical tube 54 communicating with the chamber 53 and extending upwardly to a tubular member 55 wherein the valve operating arm 47 is mounted. The lower end of the float chamber 52, is connected to the lower portion of the manifold 2 (Figs. III and IV) by means of a water-receiving pipe 56, and the upper portion of the float chamber is connected to the manifold extension 2' by means of a steam-receiving pipe 57. The float chamber is thus placed in free communication with the upper and lower portions of the boiler, and the float 51 will, therefore, rise and fall in response to corresponding changes in the level of the water in the boiler. It will now be understood that the steam valve F (Fig. I) is actuated through the medium of the float 51, and that the valve will open and close in response to changes in the water level, the object being to maintain the water at a predetermined level. When the float moves downwardly to a predetermined position, the steam valve F is opened automatically through the medium of the elements 47, 48 and 49 (Fig. I) thereby allowing steam to flow from the boiler to the steam cylinder 37 which forms part of the pumping apparatus. Water is thus supplied to the boiler until the float reaches a predetermined elevated position, whereupon the valve F is closed to discontinue the admission of steam to the pumping apparatus.

In addition to regulating the admission of water to the boiler, the float actuated devices are used to operate a pointer indicating the water level, and also to operate an electric switch which forms part of the means for controlling the fire. 58 designates an operating rod or shaft secured to the float actuated valve stem 46, as shown most clearly in Fig. XI. From the foregoing description of the float actuated devices it will be understood that this rod or shaft 58 is also actuated by the float. A pointer 59 is secured to one end of the shaft 58 (Fig. I) and this pointer lies in a housing 60 mounted on the dash D as shown in Figs. III and V. The end of the pointer 59 lies adjacent to a dial provided with the characters H, S, N and D (Figs. III and VI) indicating high, safety, normal and danger, respectively. When the water level is too high, the float actuated pointer 59 occupies a position slightly beyond the character H, and when the level is dangerously low, the pointer occupies a position slightly beyond the character D.

The automatic switch associated with the pointer 59 includes an arm 61 extending downwardly from the float actuated shaft 58, a pair of yielding contact members 62 extending from said arm 61, and a pair of stationary contact members 63 normally engaged by the yielding members 62. The arm 61, and the contact members are conductors of electricity. When the water level is normal or approximately normal, the contact members 62 engage the members 63 to provide for the flow of electricity through the float actuated switch, but when the water level is too high, or too low, the contact members 62 lie beyond the members 63 and current cannot then flow through this switch.

The pressure gage is also provided with an electric switch forming part of the means for regulating the fire. This pressure actuated switch comprises a pair of yielding contact members 64 and 64' (Figs. I and IX) extending from the arm 30 on the pressure actuated shaft 29, a stationary arcuate contact member 65' normally engaged by the contact member 64', and an adjustable arcuate contact member 65 normally engaged by the contact member 64. The stationary contact member 65' (Fig. IX) is in the form of a metal rib extending from a relatively thin metal bar 66. 67 designates a metal rod whereby the bar 66 is electrically connected to a conductor 68. The adjustable arcuate contact member 65 (Figs. I, VIII and IX) is provided with radial extensions 69 (Figs. VIII and IX) having their outer ends rigidly secured to an anuular rim 70 adjustably mounted on the housing of the pressure gage. This annular rim is split as shown at 71 in Fig. IX, to provide yielding tongues which frictionally engage the housing. It will now be understood that the rim 70 may be turned relative to the housing, so as to adjust the arcuate contact member 65 about the axis of the shaft 29. When the contact members 64 and 64' engage the arcuate contact members 65 and 65', as shown in Figs. I and IX, an electric current can flow through the pressure actuated switch, but when the contact member 64 passes from the contact member 65, the current cannot flow through said switch. The object in making the contact member 65 adjustable is to enable the switch to be adjusted for different maximum pressures. This enables any desired high pressure, for instance 600 lbs. per square inch, to be maintained when the engine is in operation, and it also enables a relatively low pressure, 25 to 50 lbs. to be maintained when the engine is idle. By adjusting the switch for the low pressure, the boiler can be maintained in a hot condition when the engine is idle, and the desired high pressure can be quickly obtained when it is desired to start the engine.

The means for conducting current to the adjustable contact member 65 (Figs. VIII and IX) comprises a pin 72 slidably mounted in a stationary metal sleeve 73, and a spring 74 whereby the pin is yieldingly forced into engagement with the contact member 65. A conductor 75 is connected to the metal sleeve 73.

The wiring herein shown comprises the conductors 68 and 75 (Fig. I) a conductor 76 leading from a battery 77 to a hand operated switch 76' which is normally closed to provide for the flow of current from the conductor 76 to the conductor 75. A conductor 78 leads from the float actuated switch to the electric motor 17, and a return conductor 79 leads from the motor to the battery 77. When all of the switches are closed, the electric motor will be energized by current obtained from the battery 77 and the motor driven fan will be actuated to force fuel from the carburetor to the burner.

To energize the ignition device, (Fig. I) the shaft of the electric motor is provided with a rotary contact breaker 80 provided with segmental conductors and cooperating with relatively stationary brushes 81 and 81'. The brush 81 is connected to the conductor 79 by means of a short conductor 82. 83 designates a conductor leading from the conductor 78 to a primary coil 84, and 85 is a conductor leading from the primary coil to the brush 81'. A secondary coil 86, associated with the primary coil, is connected to the spark plug 27, as shown in Fig. I.

The heating elements, including the resistance coil 26 surrounding the nozzle 18, and the grid 25, are connected together as shown in Fig. I. 87 designates a conductor leading from the conductor 78 to the grid 25, and 88 is a conductor leading from the resistance coil 26 to the conductor 79. A conductor 89, leading from the conductor 76 directly to the conductor 87 is provided with a normally open switch 90 which may be closed to energize the heating elements independently of the motor and spark plug.

To start the fire when the burner is cold, the switch 90 is closed, thereby allowing current from the battery 77 to flow through conductor 89 to the conductor 87 and thence through the heating elements 25 and 26 to the conductor 88 leading to the return conductor 79. The grid 25 and nozzle 18 can be thus heated when the switch 76' is open; in other words, without energizing the motor and spark plug. Thereafter the switch 90 may be opened and the switch 76' can be closed to provide for the transmission of electrical energy to all of the electrical devices. If the water level is not too high, or too low, current will flow to the motor and spark plug as soon as the switch 76' is closed, and the fuel discharged from the hot nozzle 18 will strike the hot grid 25, from which the gas rises freely to the spark plug 27 where it is ignited to start the fire, which is immediately reflected through the inspection tube T. The hand operated switch 76' remains closed as long as the system is in operation, the fire and water being controlled automatically.

The admission of water to the boiler is controlled by the float actuated valve F and if for any reason the water level becomes too high or too low, the float actuated switch 62—63 will be opened to shut off the current, thereby stopping the electric motor to discontinue the delivery of fuel to the burner, also shutting off the flow of electricity to the spark plug. When the water level again becomes normal or approximately normal, the float actuated switch will close automatically to complete the electric circuit, thereby allowing current to flow to all of the electric elements so as to automatically start the fire.

When the boiler pressure becomes too high, the pressure actuated switch will open automatically with the result of extinguishing the fire, and when the pressure thereafter drops to a degree below the predetermined maximum, this switch will close automatically so as to start the fire.

We claim:

1. A steam boiler provided with a burner for heating the water therein, a fuel discharging device for the discharge of fuel to said burner, electrical means whereby said fuel discharging device is actuated, said electrical means including a switch through which electrical energy is transmitted to actuate the fuel discharging device and said switch being adapted to be opened and closed to control the delivery of fuel to the burner, a pressure indicating gage operated by the pressure in said boiler, and means for transmitting movement from said pressure indicating gage to said switch so as to automatically open the switch in response to an abnormally high pressure.

2. A steam boiler provided with a burner for heating the water therein, a fuel discharging device for the admission of fuel to said burner, and automatic water-controlled fuel regulating means whereby said fuel discharging device is regulated to control the admission of fuel to said burner, said automatic water-controlled fuel regulating means including a water-actuated operating member movable automatically in response to changes in the level of the water in said boiler.

3. A steam boiler provided with a burner for heating the water therein, a fuel delivering device for the admission of fuel to said burner, electrical means whereby said fuel delivering device is regulated to control the admission of fuel to the burner, said electrical means including a switch through which the electrical energy is transmitted, a float movable automatically in response to changes in the level of the water in said boiler, and means for transmitting movement from said float to said switch so as to open the switch when the float moves to one of its extreme positions.

4. A steam boiler provided with a burner for heating the water therein, a fuel discharging device for the admission of fuel to said burner, electrical means for controlling the discharge of fuel from said device to the burner, said electrical means including a switch through which the electrical energy is transmitted to actuate the fuel discharging device, said switch being movable to an open position to discontinue the discharge of fuel, and automatic water-controlled fuel regulating means, whereby said switch is actuated to control the discharge of fuel, said automatic water-controlled fuel regulating means including a water-actuated operating member movable automatically in response to changes in the level of the water in said boiler, and means for transmitting movement from said automatic water-actuated operating member to said switch.

5. A steam boiler provided with a burner for heating the water therein, a blowing device for the discharge of fuel to said burner, an electric motor whereby said blowing device is actuated, an electric switch for stopping and starting said electric motor, a float movable automatically in response to changes in the level of the water in said boiler, and means for transmitting power from said float to said switch so as to stop the delivery of fuel when said float occupies a predetermined position.

6. A steam boiler provided with a burner for heating the water therein, a carburetor, a motor driven blower whereby fuel is delivered from said carburetor to said burner, a switch through which electrical energy is transmitted to said motor driven blower, said switch being movable in opposite directions to open the electrical circuit, a float movable automatically in response to changes in the level of the water in said boiler, and means for connecting said float to said switch so as to open the switch when the float occupies its extreme low and high positions.

7. A steam boiler provided with a burner for heating the water therein, a fuel discharging device for the admission of fuel to said burner, electrical means controlling said fuel discharging device so as to control the admission of fuel to the burner, said electrical means including an electric circuit through which the electrical energy is transmitted, two switches in said electric circuit, each of said switches being movable to discontinue the delivery of fuel to the burner, automatic water controlled fuel regulating means including a float movable in response to changes in the level of the water in said boiler and means for transmitting power from said float to one of said switches so as to discontinue the delivery of fuel when the float reaches a predetermined position; and a pressure actuated switch operating device connected to the other switch, said pressure actuated switch operating device being operated by the pressure in the boiler.

8. A steam boiler provided with a burner for heating the water therein, a carburetor provided with an injector for the delivery of fuel to said burner, a blower for the discharge of fuel through said injector, an electric motor actuating said blower, switches controlling the flow of electrical energy to said motor, a pressure-actuated switch operating device for opening and closing one of said switches, said pressure actuated switch operating device being operated by the pressure in said boiler, a float movable automatically in response to changes in the level of the water in said boiler, and means for transmitting power from said float to another of said switches so as to open and close the last mentioned switch.

9. A steam boiler provided with a burner for heating the water therein, an electrically operated fuel discharging device for the admission of fuel to said burner, an electrical heating device for heating the fuel before it passes from said burner, regulating means whereby said fuel discharging device is regulated to control the delivery of fuel to said burner, and a separate regulating device for said electrical heating device.

10. A steam boiler provided with a burner for heating the water therein, a fuel discharging device for the admission of fuel to said burner, an electrical heating device for heating the fuel before it passes from said burner, regulating means whereby said fuel discharging device and electrical heating device are regulated simultaneously, and a separate regulating device for said electrical heating device.

11. A boiler provided with a burner for heating the liquid therein, a fuel-regulating device controlling the delivery of fuel to said burner, and operating means whereby said fuel-regulating device is controlled to automatically discontinue the delivery of fuel when the liquid in said boiler reaches a predetermined low level and also when said liquid reaches a predetermined high level, said operating means including an operating member movable in response to changes in the liquid level.

12. In apparatus of the class described, in combination, a burner for heating water, a mixing device for mixing fuel and air for use in said burner, a source of compressed air adapted to convey air toward said burner, means whereby the air draws along with it a desired amount of fuel, and means responsive to changes of water level for controlling said source.

In testimony that we claim the foregoing we hereunto affix our signatures.
GEORGE F. MOORS.
EDWARD E. MARTIN.